Figure 2:
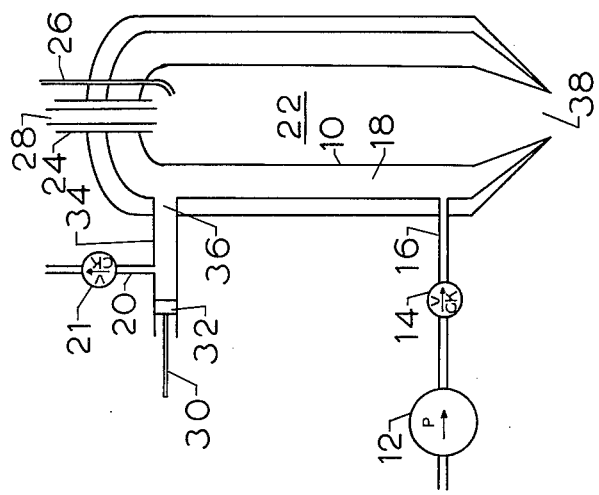

Aug. 31, 1965   C. LE ROY CARPENTER   3,203,762
APPARATUS AND PROCESS FOR THE PRODUCTION OF TITANIUM DIOXIDE
Filed Nov. 30, 1962   2 Sheets-Sheet 1

United States Patent Office 3,203,762
Patented Aug. 31, 1965

3,203,762
APPARATUS AND PROCESS FOR THE PRODUCTION OF TITANIUM DIOXIDE
Clifford Le Roy Carpenter, Wellesley Hills, Mass., assignor to Cabot Corporation, Boston, Mass., a corporation of Delaware
Filed Nov. 30, 1962, Ser. No. 241,329
3 Claims. (Cl. 23—202)

This invention relates to pyrogenically produced pigments and in particular to an improved apparatus for producing pyrogenic pigments.

Pyrogenic and vapor phase processes for producing pigments such as are suggested in U.S. 2,488,439, 2,488,440 or 2,980,509, or by Gosta Flemmert in "Studies on Inorganic Fillers" published in 1953 by Darlarnes Tiduings-Och Boktrychkeri-AB. Sweden, are extremely advantageous in that said pyrogenic processes:

(a) Are not subject to as severe a problem of aggregation of the finely divided pigment product which problem normally occurs when pigments are produced by wet or liquid phase processes, such as by precipitation from solution, and (b) Simplify the product recovery problem by eliminating the need for drying the product or otherwise removing liquids associated therewith.

However, a disadvantage heretofore associated with the production of pyrogenic pigments, and especially pyrogenic titanium dioxide pigments, resides in the fact that during the continuous production of said pigments in a reaction chamber, build-up of said pigments on the walls of the reaction chamber, frequently occurs. In the case of titanium dioxide production, it has been found that the titanium dioxide build-up upon the walls of the reaction chamber remains thereon for an extended period of time, and has pigmentary properties generally very much poorer in quality than the product withdrawn continuously from the reaction chamber after a residence time therein of up to about 20 seconds. Thus, it has been found that titanium dioxide may accumulate on the reaction chamber walls over a period of hours to a thickness of several inches before falling off and entering the collection system, thereby contaminating the titanium dioxide product. Even if it were possible to separate the titanium dioxide which had accumulated on the wall from the quality product, the sub-standard titanium dioxide from the wall would represent a significant financial loss. In accordance with the present invention, however, this problem has been minimized.

Accordingly, it is a principal object of the present invention to provide a means for preventing the accumulation of products of vapor phase reaction on the reactor walls.

It is another object of the present invention to provide improved titanium dioxide pigments.

Other objects of the present invention will in part be obvious and in part appear hereinafter.

Currently, pigment grade (i.e. having a particle size of between about 200 and about 400 millimicrons), pyrogenic titanium dioxide is generally produced by hydrolysis and/or oxidation, at temperatures of above about 800° C., of a relatively volatile titanium compound, such as a halide or an oxyhalide, as illustrated by the following equations:

(a) $TiCl_4 + O_2 \rightarrow TiO_2 + 2Cl_2\uparrow$,
(b) $TiCl_4 + O_2 + 2H_2 \rightarrow TiO_2 + HCl1\uparrow$,
(c) $2TiOCl_2 + 2H_2 + O_2 \rightarrow 2TiO_2 + 4HCl1\uparrow$, and/or
(d) $2TiOCl_2 + O_2 \rightarrow 2TiO_2 + 2Cl_2\uparrow$.

It has been found that the accumulation of titanium dioxide on the surface which often occurs during said reaction usually consists of an agglomerate comprising titanium dioxide pigment particles which adhere loosely to one another; thus, the accumulation or "cake" is of a frangible nature. When such a cake is cracked, broken or the like, it has been found that normally there is a decided tendency for said cake to crumble to the extent that a complete purge thereof occurs.

In accordance with the present invention, said cake in its early stages is caused, by flexure of the reactor wall, to crack, break, etc., and thus ultimately crumble and be conveyed from the reaction zone by the gases of the reaction.

Figure 1:
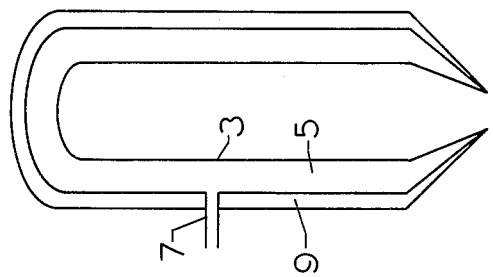
Figure 3:
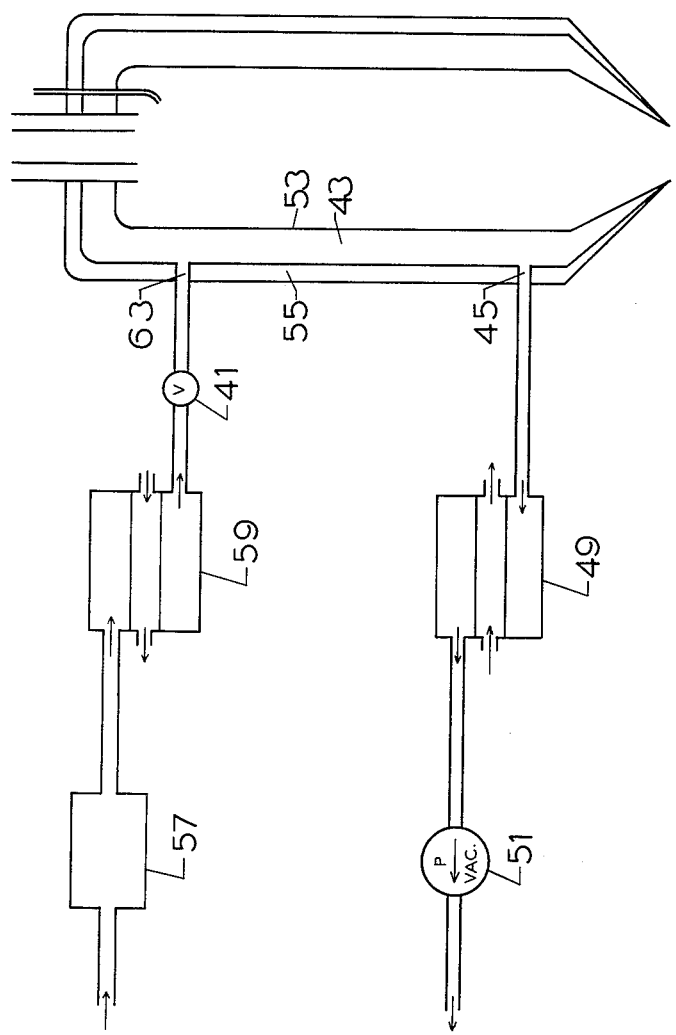

The above and other objects and advantages of the present invention will be more readily understood when reference is had to the accompanying drawings forming part hereof, wherein:

FIGURE 1 is a schematic diagrammatic view of one embodiment of the present invention, i.e. a reactor wall system wherein flexure of the inner wall of the reactor can readily be accomplished;

FIGURE 2 is a schematic diagrammatic view of another embodiment of the present invention wherein flexure of the inner wall of the reactor is accomplished by hydraulic forces actuated by a piston-cylinder arrangement; and FIGURE 3 is a schematic diagrammatic view of still another embodiment of the present invention wherein flexure of the inner wall of the reactor is accomplished by the alternate application and release of a vacuum between the inner and outer walls of the reactor.

In a typical flexure cycle, referring now to FIGURE 1, gas or liquid is introduced into pressure chamber 5 having a flexible inner wall 3 and a non-flexible outer wall 9 through inlet-outlet 7. When a liquid is utilized, for example, pressure chamber 5 is normally maintained substantially full of said liquid. Thus, the introduction thereinto of more liquid produces increased pressure throughout pressure chamber 5 thereby effecting a flexure of flexible inner wall 3. Thereafter, withdrawal of said liquid through inlet-outlet 7 causes flexible inner wall 3 to return to its former position, thus completing the flexure cycle.

It should be noted that the aforementioned cycle, may also be effectively accomplished in many other ways such as by the evacuation of resident gas or liquid from pressure chamber 5 via inlet-outlet 7, causing flexible inner wall 3 to flex in the direction of outer wall 9. Thereafter a return of the liquid or gas to pressure chamber 5 forces flexible inner wall 3 to return to its original position.

In a typical case of the oxidation of titanium tetrachloride to produce titanium dioxide, referring now to FIGURE 2, inner wall 10 is cooled by the action of pump 12 forcing water through check valve 14 and conduit 16, thence into pressure chamber 18. The coolant is thereafter exited through conduit 20 and check valve 21. Reaction chamber 22 is preheated by burning therein a mixture of CO and $O_2$, said burning being initiated by the introduction into the reactor by means of conduit 24 of a mixture of CO and $O_2$ and the subsequent ignition thereof by the action of igniter 26. Thereafter, the temperature within the reactor is regulated by adjusting the relative amounts of CO and $O_2$ introduced into the reaction chamber. When the temperature of the reaction chamber reaches about 900° C., a mixture of dry oxygen (or air) and titanium tetrachloride is introduced thereinto by means of conduit 28 and ignition occurs immediately. (Alternatively, the oxygen and titanium tetrachloride can be introduced separately.) After spontaneous ignition, the reaction between the oxygen and titanium tetrachloride proceeds as illustrated in Equation (a)

(a) $TiCl_4 + O_2 - TiO_2 + 2Cl_2$ to produce titanium dioxide having an average particle diameter of between about 200 and about 400 millimicrons. Soon after ignition, periodic flexure of inner wall 10 is initiated by the actuation of a hydraulic system (not shown) which forces ram 30 and piston 32 back and forth within the confines of cylinder 34, thereby closing conduit 20 and forcing liquid alternately into and out of pressure chamber 18 by means of inlet-outlet 36, the ensuing alternate increase and decrease in pressure causing the periodic flexure of inner wall 10.

In another embodiment of the present invention, referring now to FIGURE 3, flexure of inner wall 53 is accomplished in two stages. Stage one begins when timed valve assembly 41 closes, thereby preventing the passage therethrough of steam. Steam is then withdrawn from pressure chamber 43, through outlet 45 and cooling zone 49, and thence into vacuum pump 51. The relative vacuum now existing between inner wall 53 and outer wall 55 effects flexure of inner wall 53. Stage two begins with the opening of timed valve assembly 41, which allows water to pass from existing piping (not shown) seriatim through demineralizer 57, heating zone 59 wherein steam is formed, timed valve assembly 41, and thence into pressure chamber 43 through inlet 63. Since the pressure in pressure chamber 43 has now returned to atmospheric, inner wall 53 returns to its original position.

Requisites for the fabrication of the present invention are, in the main, self-evident. Referring now for the purposes of illustration to FIGURE 1, general requirements for inner wall 3 are that (a) said wall be flexible, (b) said wall be substantially non-reactive under reaction conditions with the reactants, products of reaction and the pressurizing agents to be utilized, and (c) said wall be capable of withstanding the pressures and stresses incurred during flexure. Moreover, it is preferred that said inner wall be of such design that a relatively large surface area per unit volume be effected. Thus, polygonally designed inner walls are preferred for use with the present invention. Specific examples of materials which are generally suitable for the purposes of the present invention when titanium dioxide is to be produced at temperatures between about 800° C. and about 1400° C. are aluminum, titanium, stainless steel, and the like.

General requirements for the design and fabrication of outer wall 9 are (a) that said wall be substantially non-reactive with the pressurizing agent, (b) that said wall be capable of withstanding the pressures incurred during flexure of the inner wall, and (c) that said wall enclose at least in part, inner wall 3. Moreover, it is generally preferred that said outer wall be of a non-flexible material in order that pressurization effects a flexure of the inner wall only. Specific examples of materials generally suitable for fabrication of the outer reactor wall are: cast iron, cast steel, stainless steel, ceramic materials and the like.

The basic requirements for the pressurization system utilized in the present invention are that (a) said system be capable of effecting the pressure changes required for the flexure of the inner wall, and (b) said system have provision for periodically changing the pressure existing between the inner and outer walls of the reactor. Specific examples of normally suitable pressure altering agents are: nitrogen, air, steam, silicone oils, ethylene glycol, water, liquified metals and the like.

A better understanding of the invention can be obtained from the following examples which, however, should be construed as being illustrative in nature and as not limiting the scope of the invention:

*Example 1*

Referring now to apparatus of the type pictured in FIGURE 2, cooling of .060″ thick stainless steel inner wall 10 is initiated as described previously. Then there is fed to reaction chamber 22 having a cross sectional area of approximately 7 square feet and a length of 6 feet by means of conduit 24, a mixture of carbon monoxide and oxygen in the following quantities (STP); carbon monoxide 432 c.f.h., oxygen 324 c.f.h. Said mixture is then ignited by igniter 26 and the resulting combustion allowed to continue until the temperature of reaction chamber 24 reaches 850° C. Next, a mixture of titanium tetrachloride and dry air (144 lbs./hr. titanium tetrachloride and 1630 c.f.h. dry air, STP) is introduced into reaction chamber 22 by means of conduit 28. The reaction initiates immediately and there is produced in reaction chamber 22 about 60.6 lbs./hr. of titanium dioxide which is continuously withdrawn from the reaction chamber. After about 36 hours of operation, the operation is terminated and reaction chamber 22 examined, and it is found that substantial accretion of titanium dioxide upon inner wall 10 has occurred. Furthermore, it is found that orifice 28 is severely fouled, remaining about 75% patent. The titanium dioxide which has been withdrawn is then tumble-mixed for one hour to produce a substantially homogeneous blend and is subsequently tested for tinting strength using Test D332, 57T, as set forth in ASTM Standards on Paint, Varnish, Lacquer and Related Products. Said pigment is found to have a tinting strength value of 1350. Moreover, it is found that a substantial proportion of the particles of titanium dioxide pigment in said blend have a diameter far greater than desired, i.e. said particles have a diameter greater than about 400 millimicrons.

*Example 2*

This example is a duplicate of Example 1 with the exception that in this example, the hydraulic system (not shown) which drives rod 30 and piston 32 is activated at one minute intervals throughout the entire reaction period. It is found that after about 36 hours of continuous operation, there is no evidence of plugging of the reaction chamber. Upon shutdown, it is further found that only minor accretion upon the reaction chamber walls has occurred. Tinting strength values of the titanium dioxide obtained by following the testing procedure set forth in Example 1 above, shows a significant increase, i.e. about 400 points higher, than the values obtained in accordance with Example 1. Furthermore, only a small number of oversize particles are found.

The pigments produced in accordance with the present invention may be subjected to such aftertreatment as is desired to fit said pigments for particular uses or to impart desired properties.

Obviously, many changes may be made in the above illustrated apparatus. For instance, in FIGURE 2, the pressurizing system can be modified in many ways in order to fit said system to particular environmental and chemical requisites. Thus, in systems wherein it is required that environmental temperatures be held relatively constant, or wherein it is required that heat be supplied to that reaction chamber, it is entirely possible to utilize the pressurant liquid or gas as a heat exchange material. Thus, the use of steam as a pressurant can serve not only as the agent for the flexure of the reactor wall, but also as an environmental temperature modifier for the reaction. Moreover, in cases wherein it is necessary to insulate the reaction chamber from ambient temperatures, the use of intermittent vacuum as a reactor wall flexing modality also serves to insulate the inner wall of the reaction chamber. A typical system in which the pressurant utilized can also be served as an environmental temperature modifier is shown in FIGURE 3.

Accordingly, it is intended that the above disclosure be regarded as illustrative and as in no way limiting the scope of the invention.

What I claim is:

1. A process for converting at temperatures above about 800° C. in a double walled reaction chamber titanium tetrachloride in vapor form to solid titanium oxides in aerosol form while preventing the accretion of substantial solid matter on the walls of said reaction chamber, which comprises introducing axially into one end of the reaction chamber (a) titanium tetrachloride and (b)

a co-reactant comprising a molecular oxygen-containing gas, periodically flexing the wall of said reaction chamber by varying the pressure between the inner and outer walls and conducting the aerosol formed in said chamber from the end of said chamber opposite to the end wherein said substance is introduced.

2. Apparatus for converting a substance chosen from the group consisting of a titanium halide, a titanium oxyhalide and mixtures thereof to titanium oxides which comprises a reaction chamber having a flexible wall, an inlet and an outlet disposed axially in said chamber, an injector in the inlet adapted to discharge said substance into said chamber, means to introduce a co-reactant gas into said chamber, a wall spaced from and at least partially covering said flexible wall and defining a pressure chamber, means for periodically varying the pressure within said pressure chamber so as to cause periodic flexure of said flexible wall and means to recover the products produced in the reaction chamber from said outlet.

3. Apparatus for converting a substance chosen from the group consisting of a titanium halide, a titanium oxyhalide, and mixtures thereof to titanium oxides which comprises a reaction chamber having a flexible inner wall, an inlet and an outlet disposed axially in said chamber, an injector in the inlet adapted to discharge said substance into said chamber, means to introduce a co-reactant gas into said chamber, an outer wall spaced from and at least partially covering said inner wall, means for supplying a medium chosen from the group consisting of a gas, a liquid and mixtures thereof to the space between said inner and outer walls, means for seriatim increasing and decreasing the pressure exerted by said medium upon said walls so as to cause said flexible inner wall to flex, and means to recover the products produced in the reaction chamber from said outlet.

References Cited by the Examiner

UNITED STATES PATENTS

| | | | |
|---|---|---|---|
| 2,317,566 | 4/43 | Utterback | 202—241 X |
| 2,893,850 | 7/59 | Von Bichowsky | 23—223.5 X |
| 3,068,113 | 12/62 | Strain et al. | 23—202 X |

OTHER REFERENCES

"Roget's International Thesaurus" by C. O. S. Mawson, 1938 edition, page 25. Thomas Y. Crowell Co., N.Y.

MAURICE A. BRINDISI, *Primary Examiner.*

UNITED STATES PATENT OFFICE
CERTIFICATE OF CORRECTION

Patent No. 3,203,762                                August 31, 1965

Clifford Le Roy Carpenter

It is hereby certified that error appears in the above numbered patent requiring correction and that the said Letters Patent should read as corrected below.

Column 1, line 66, for "HCl 1↑" read -- 4HCl↑ --; line 67, for "4HCl 1↑ " read -- 4HCl↑ --; column 3, line 48, is printed upside down and should read -- ferred that said outer wall be of a non-flexible material --.

Signed and sealed this 10th day of January 1967.

(SEAL)
Attest:

ERNEST W. SWIDER                            EDWARD J. BRENNER
Attesting Officer                                Commissioner of Patents